United States Patent
Smedley

(10) Patent No.: US 6,787,260 B2
(45) Date of Patent: Sep. 7, 2004

(54) ELECTROLYTE-PARTICULATE FUEL CELL ANODE

(75) Inventor: Stuart I. Smedley, Escondido, CA (US)

(73) Assignee: Metallic Power, Inc., Carlsbad, CA (US)

(*) Notice: Subject to any disclaimer, the term of this patent is extended or adjusted under 35 U.S.C. 154(b) by 3 days.

(21) Appl. No.: 10/353,636

(22) Filed: Jan. 29, 2003

(65) Prior Publication Data

US 2004/0053097 A1 Mar. 18, 2004

Related U.S. Application Data

(60) Provisional application No. 60/410,474, filed on Sep. 12, 2002.

(51) Int. Cl.[7] ................................ H01M 8/04
(52) U.S. Cl. ...................... 429/27; 429/15; 429/34
(58) Field of Search .................... 429/27, 34, 15

(56) References Cited

U.S. PATENT DOCUMENTS

| | | |
|---|---|---|
| 3,440,098 A | 4/1969 | Stachurski |
| 3,451,851 A | 6/1969 | Stanimirovitch |
| 3,639,173 A | 2/1972 | Stachurski |
| 3,663,298 A | 5/1972 | McCoy et al. |
| 3,716,413 A | 2/1973 | Eisner |
| 3,767,466 A | 10/1973 | McCoy et al. |
| 3,811,952 A | 5/1974 | Siwersson et al. |
| 3,847,671 A | 11/1974 | Leparulo et al. |
| 3,887,400 A | 6/1975 | Doniat et al. |
| 3,902,918 A | 9/1975 | Pompon |
| 3,970,472 A | 7/1976 | Steffensen |
| 3,981,747 A | 9/1976 | Doniat et al. |
| 3,985,581 A | 10/1976 | Stachurski et al. |
| 4,074,028 A | 2/1978 | Will |
| 4,127,701 A | 11/1978 | Symons et al. |
| 4,145,482 A | 3/1979 | von Benda |
| 4,147,839 A | 4/1979 | Solomon et al. |
| 4,172,924 A | 10/1979 | Warszawski |
| 4,218,521 A | 8/1980 | Putt et al. |
| 4,272,333 A | 6/1981 | Scott et al. |
| 4,352,864 A | 10/1982 | Struthers |
| 4,479,856 A | 10/1984 | Ando |
| 4,730,153 A | 3/1988 | Breting et al. |
| 5,006,424 A | 4/1991 | Evans et al. |
| 5,188,911 A | 2/1993 | Downing et al. |
| 5,260,144 A | 11/1993 | O'Callagham |
| 5,318,861 A | 6/1994 | Harats et al. |
| 5,348,820 A | 9/1994 | Suga et al. |
| 5,360,680 A | 11/1994 | Goldman et al. |
| 5,378,329 A | 1/1995 | Goldstein et al. |
| 5,382,482 A | 1/1995 | Suga et al. |
| 5,434,020 A | 7/1995 | Cooper |
| 5,441,820 A | 8/1995 | Siu et al. |
| 5,558,947 A | 9/1996 | Robison |
| 5,578,183 A | 11/1996 | Cooper |
| 5,635,051 A | 6/1997 | Salas-Morales et al. |
| 5,849,427 A | 12/1998 | Siu et al. |
| 5,869,200 A | 2/1999 | Nunnally |
| 5,885,727 A | 3/1999 | Kawatsu |
| 5,952,117 A | 9/1999 | Colborn et al. |
| 5,958,210 A | 9/1999 | Siu et al. |
| 6,162,555 A | 12/2000 | Gutierrez et al. |
| 6,613,471 B2 * | 9/2003 | Ovshinsky et al. ............ 429/42 |
| 2003/0170524 A1 * | 9/2003 | Kordesch et al. ............. 429/34 |

FOREIGN PATENT DOCUMENTS

| | | |
|---|---|---|
| FR | 2639767 A1 | 11/1988 |
| FR | 2669775 A1 | 11/1990 |

* cited by examiner

Primary Examiner—John S. Maples
(74) Attorney, Agent, or Firm—Patterson, Thuente, Skaar & Christensen, P.A.; Peter S. Dardi

(57) ABSTRACT

An improved electrolyte-particulate fuel cell where the fuel cell includes an anode, cathode, a bottom surface area formed by the anode and cathode where fuel flows from top to bottom, and a screen where the screen is located near the anode's bottom and has a surface area greater than the cell's bottom surface area.

18 Claims, 4 Drawing Sheets

US 6,787,260 B2

ELECTROLYTE-PARTICULATE FUEL CELL ANODE

CROSS REFERENCE TO RELATED APPLICATIONS

This application claims priority to Provisional Patent Application No. 60/410,474 filed Sep. 12, 2002, and entitled "Means for Enhancing Performance of Anode in Zinc Fuel Cell," which is hereby incorporated by reference for its teachings.

BACKGROUND OF THE INVENTION

1. Field of the Invention

This invention relates to fuel cell anodes, in particular electrolyte-particulate fuel cell anodes.

2. Description of Related Art

Fuel cells, as with batteries, generate useful energy by providing an oxidation reaction at a negative electrode/anode and a reduction reaction at a positive electrode/cathode. The electrical potential difference between the positive electrode and the negative electrode can be used to generate useful energy. Fuel cells can often involve one or more gaseous reactants. Gas diffusion electrodes, i.e., gas permeable electrodes, are suitable for use in electrochemical cells that have gaseous reactants, for example, for use in the cathode for the reduction of oxygen, bromine or hydrogen peroxide. The reduction of gaseous molecular oxygen can be an electrode reaction, for example, in metal-air/oxygen batteries, metal-air/oxygen fuel cells and hydrogen-oxygen fuel cells. Oxygen is generally conveniently supplied to these electrochemical cells in the form of air. The oxidation reaction at the anode gives rise to the electrons that flow to the cathode when the circuit connecting the anode and the cathode is closed.

The electrons flowing through the closed circuit enable the foregoing oxygen reduction reaction at the cathode and simultaneously can enable the performance of useful work due to an over-voltage between the cathode and anode. For example, in one embodiment of a fuel cell employing metal, such as zinc, iron, lithium and/or aluminum, as a fuel and potassium hydroxide as an electrolyte, the oxidation of the metal to form an oxide or a hydroxide releases electrons. In some systems, a plurality of cells is coupled in series, which may or may not be within a single fuel cell unit, to provide a desired voltage. For commercially viable fuel cells, it is desirable to have electrodes that can function within desirable parameters for extended period of time on the order of 1000 hours or even more.

SUMMARY OF THE INVENTION

The present invention relates to an improved electrolyte-particulate fuel cell. The fuel cell comprises a cathode and an anode through which electrolyte flows, for example, from top to bottom. The fuel cell can include a mesh or screen where the screen is located near the end of the anode along the flow, such as the bottom of the anode for flow from the top to the bottom, and where the screen has a surface area greater than the anode's bottom cross-sectional area. In one embodiment, the screen has a surface area that is at least 40 percent greater than the anode's bottom cross-sectional area. The screen may an expanded metal or polymer mesh, a woven metal or polymer mesh, or a perforated metal or polymer sheet. In some embodiments, the screen may comprise a series of parallel ribs.

In a fuel cell where an electrolyte-particulate based fuel flows along its anode, larger particles gradually dissolve within the anode and participate in energy generation. The particles form a static bed that is gradually consumed and replenished while the electrolyte generally is in continuous flow. The dissolving, smaller particles of the electrolyte-particulate fuel may congregate at the anode bottom and thereby reduce the fuel flow rate and current density for the fuel cell. The anodes described herein provide an electrolyte-particulate fuel cell anode that improves the electrolyte flow rate with reduced particulate blockage at the anode bottom.

In one embodiment the particulate has an initial pre-consumption approximate size and becomes smaller as it flows along the anode, for example, from the cell top to bottom, under electrical load. In this embodiment, the screen has a plurality of openings where at least one of the plurality of openings has an area size that enables some unconsumed and some partially consumed particulate to pass. In one exemplary embodiment, the particulate is zinc particles and the electrolyte is potassium hydroxide. Further, the pre-consumption zinc particles may have a diameter of about 0.5 mm. In one embodiment the cell width is about 2.0 mm. In another embodiment at least one of the plurality of screen openings has a width of about 0.6 mm and a height of about 1.0 mm. In another embodiment at least one the plurality of screen openings is circular. In a further embodiment at least one of the plurality of screen openings has a width of about 0.6 mm and a height of at least 2.5 mm, in other embodiments at least one of the plurality of screen openings has dimensions of 2 mm by 2 mm and in further embodiments, at least one of the plurality of screen openings has dimensions of 1.2 mm by 2 mm.

BRIEF DESCRIPTION OF THE DRAWINGS

Like reference numbers and designations in the various drawings indicate like elements.

DETAILED DESCRIPTION OF THE PREFERRED EMBODIMENTS

Figure 1:
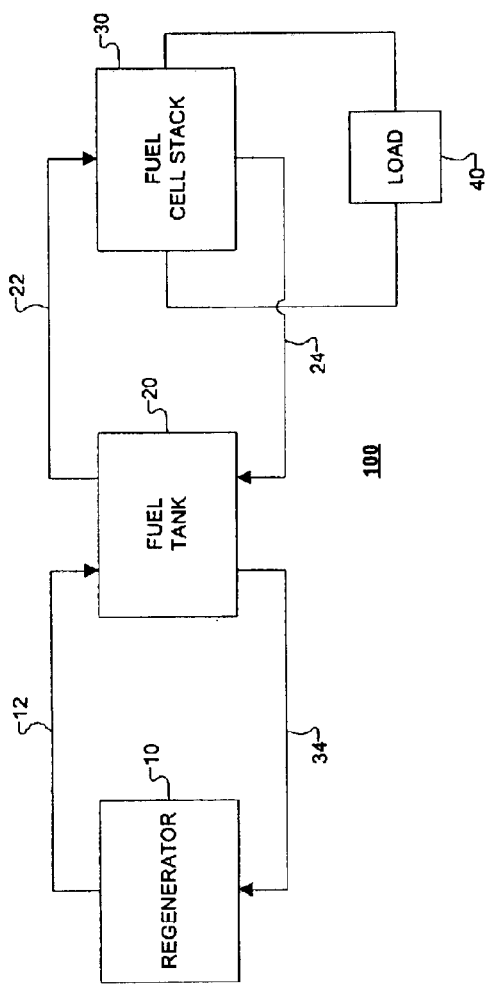
FIG. 1 is a block diagram of an embodiment of an electrolyte-particulate fuel cell system in which the present invention may be employed.

To improve the flow of electrolyte through the anode of a metal based fuel cell, a mesh or screen is placed within the flow in the anode in which the screen has a flow surface area greater than the cross sectional area of a flow channel within the anode. The electrolyte flows through a channel within the anode adjacent a separator between the anode and the cathode. Use of the screen with a surface area larger than the cross section of the flow provides for enhanced control of the flow while reducing the chance of at least partial blockage of the flow. Blockage of the flow can lead to reduction in the electrolyte flow rate below desired values and other undesirable results. To place the screen with this enhanced flow area within the flow, the screen, for example, can be placed at an angle and/or the shape of the screen can be made non-planar.

The screen allows particles smaller than the passages or openings in the screen to flow through the screen while larger particles are retained. The metal particles form a static bed of particles for oxidation. The degradation rate of the fuel generally depends on the amount of current flowing through the closed circuit from the anode. Generally, the cathode is a gas diffusion electrode. Gas diffusion electrodes, i.e., gas permeable electrodes, are suitable for use in electrochemical cells that have gaseous reactants, for example, for use in the cathode for the reduction of oxygen, bromine or hydrogen peroxide. Oxygen can be conveniently supplied to these fuel cells in the form of air. The electrolyte can be an alkaline aqueous solution, such as a potassium hydroxide solution.

Particles are introduced at one end of the bed, generally at the top of the bed, and as the particles dissolve they become smaller and migrate toward the other end of the bed. This migration of the particles leads to a gradient in the particle size with larger particles near the inflow and smaller particles near the outflow. At the outflow of the bed, a mesh allows smaller particles to leave the bed with the electrolyte flow for flushing into a reservoir tank. Due to the increased surface area of the improved screen, the retained particles are significantly less likely to inhibit significantly the electrolyte flow through the screen in comparison with a screen that is planer and that has a flow area equal to the cross section of the anode channel. In particular, smaller particles are more likely to block the flow, and the improved screen facilitates the removal of the smaller particles through the extended surface area of the screen. The particle bed essentially forms an approximately stationary bed of metal particles in which bridging of the particles across the narrow width of the bed flow channel contributes along with the screen to maintenance of particles within the bed flow channel. Gradual electrochemical dissolution of the particles leads to a gradual flow of the particles which are replenished in the flow.

While a variety of fuels can be used to participate in the reactions at the positive electrode, elemental metals provide a high density so that the volume of the fuel cell can be smaller for a given capacity to deliver power. In particular, zinc can be used as a fuel. With zinc as a fuel, the reaction at the cathode can be represented by the following reaction:

$$Zn + 4OH^- \rightarrow Zn(OH)_4^{2-} + 2e^- \qquad (2)$$

During discharge of the fuel cell, the forward reaction takes place at the positive electrode, and during recharging of the fuel cell, the reverse reaction takes place at the positive electrode. Alternatively, the zincate ion, $Zn(OH)_4^{2-}$, can be allowed to precipitate to zinc oxide, ZnO, a second reaction product, in accordance with the following reaction:

$$Zn(OH)_4^{2-} \rightarrow ZnO + H_2O + 2OH^- \qquad (3)$$

In this case, the overall reaction which occurs in the cell cavities is the combination of the three reactions (1), (2), and (4). This overall reaction can be expressed as follows:

$$Zn + \frac{1}{2}O_2 \rightarrow ZnO \qquad (4)$$

The electrons flowing through the closed circuit enable the foregoing oxygen reduction reaction at the cathode and simultaneously can enable the performance of useful work due to an over-voltage between the cathode and anode. For example, in one embodiment of a fuel cell employing metal, such as zinc, iron, lithium and/or aluminum, as a fuel and potassium hydroxide as an electrolyte, the oxidation of the metal to form an oxide or a hydroxide releases electrons. In some systems, a plurality of cells is coupled in series, which may or may not be within a single fuel cell unit, to provide a desired voltage. For commercially viable fuel cells, it is desirable to have electrodes that can function within desirable parameters for extended period of time on the order of 1000 hours or even more.

FIG. 1 is a block diagram of an embodiment of an electrolyte-particulate fuel cell system 100. The system 100 includes a regenerator 10, a fuel tank 20, fuel cell stack 30, and load 40. The fuel tank 20 supplies electrolyte-particulate fuel to the fuel cell stack 30 via a conduit 22. The fuel cell stack receives the fuel and consumes the particulate to release electrons to drive the load 40. The particulate consumption produces a byproduct that flows with unconsumed electrolyte-particulate fuel back to the fuel tank 20 via a conduit 24. The fuel tank 20 directs the byproduct and the byproduct along with electrolyte flows to the regenerator 10 via a conduit 34. The regenerator 10 converts the received electrolyte byproduct into electrolyte-particulate fuel and supplies the converted fuel to the fuel tank 20 via a conduit 12. An exemplary fuel cell system 110 that employs potassium hydroxide/zinc as fuel is presented with reference to FIG. 2. The regenerator 10, the fuel tank 20, and the fuel cell stack 30 need not be co-located. In one embodiment the regenerator 10 may be stationary while the fuel tank 20 and fuel cell 30 are located in a mobile vehicle. The fuel and electrolyte may be transferred between the stationary regenerator 10 and fuel tank 20 via hoses (12, 34).

Figure 2:
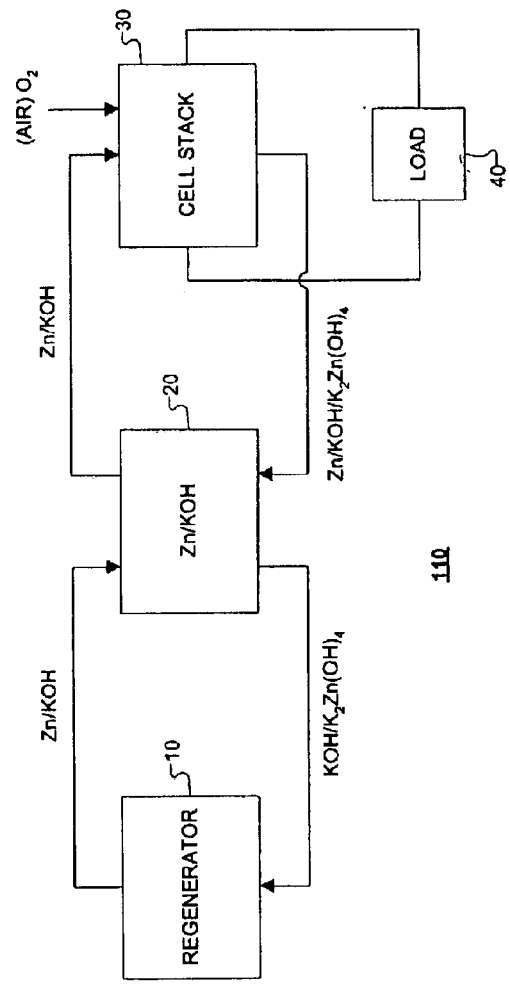
FIG. 2 is a block diagram of an embodiment of a potassium hydroxide/zinc fuel cell system in which the present invention may be employed.

FIG. 2 is a block diagram of an embodiment of a potassium hydroxide/zinc ("KOH/Zn") fuel cell system in which the present invention may be employed. The system includes regenerator 10, fuel tank 20, cell stack 30, and load 40 similar to the system 100 shown in FIG. 1. In this system, the fuel is KOH/Zn where the zinc is in the form of small particles. The cell stack 30 consumes the Zn particles in the KOH/Zn (from the fuel tank 20) and oxygen from atmospheric air to drive the load 40. The byproduct is potassium zincate ("$K_2Zn(OH)_4$"). Partially consumed zinc particles (as well as potentially some unconsumed zinc particles), electrolyte, and byproduct ("Zn/KOH/$K_2Zn(OH)_4$") flow from the cell stack 30 to the fuel tank 20. The fuel tank filters zinc particles from the mixture and an electrolyte/potassium zincate mixture flows to the regenerator 10. In one embodiment, the regenerator 10 employs an electrolyzer to convert the electrolyte/potassium zincate mixture back in zinc metal and oxygen.

The reverse reaction has the form: $Zn(OH)_4^{2-} \rightarrow Zn + 2OH^- + \frac{1}{2}O_2 + H_2O$.

Figure 3:
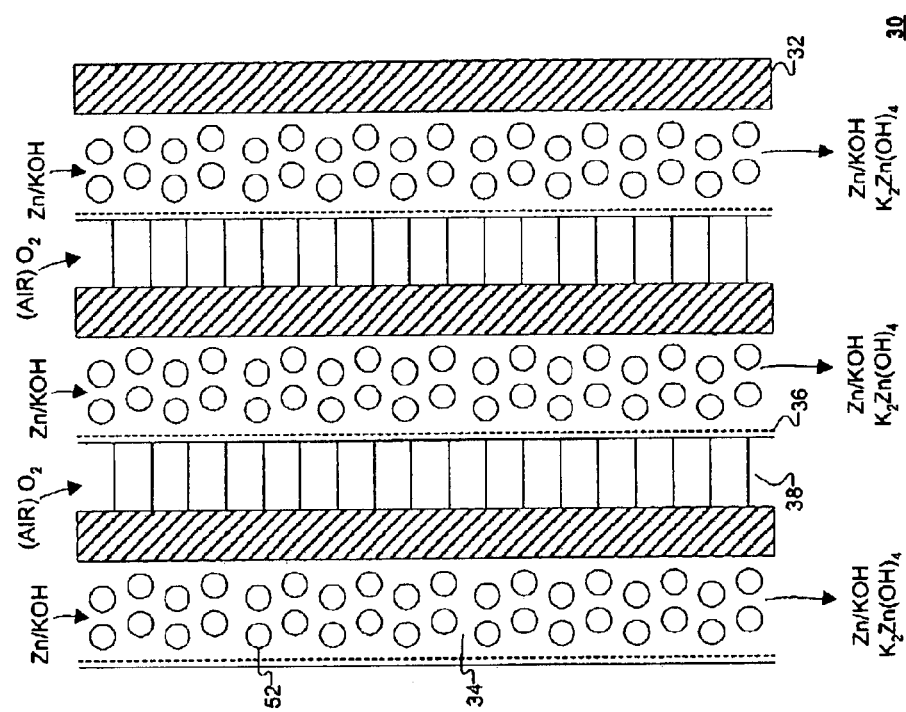
FIG. 3 is a sectional view of a segment of an exemplary potassium hydroxide/zinc fuel cell stack of the system shown in FIG. 2 in which the present invention may be employed.

FIG. 3 is a diagram of a segment of an exemplary potassium hydroxide/zinc fuel cell stack 30 of the system shown in FIG. 2 in which the present invention may be employed. The fuel cell is a plurality of cells connected together to produce a higher output voltage. The exemplary fuel cells 32 include a cathode, anode 34, anode mesh 36, and anode-cathode connectors 38. In the anode 34, Zn particles 52 received in the electrolyte-particulate fuel (Zn/KOH) are consumed and release electrons that drive a load (40) and produce the byproduct potassium zincate. The anode reaction has the form: $Zn+4OH^- \rightarrow Zn(OH)_4^{2-}+2e$ Oxygen ($O_2$) from ambient air accepts electrons from the load (40) in the cathode. The cathode reaction has the form: $\frac{1}{2}O_2+H_2O+2e \rightarrow 2OH^-$. In the fuel cell the Zn/KOH flows through each anode and the zinc particles are consumed as a function of the load (40). In order to generate a desired current density, the fuel (Zn/KOH) must flow through the cells at a controlled rate. The present invention employs the mesh/screen 36 to help maintain a desired fuel flow rate (through the cells).

In general, the screen has a plurality of openings through which fluids and particles smaller than the openings can pass. The plurality of openings can be arranged, for example, in a two dimensional array across the surface of the screen. The screen generally comprises a planar sheet of material having spatial dimensions across the planar extent significantly greater than the thickness of the planar dimensions. However, the screen can be contoured to have a non-planar geometry with a surface area corresponding approximately to the area of the sheet stretched back to a planar shape. By contouring the screen, the surface area can be increased relative to a projected area of the contoured structure, e.g., the largest area obtained by projecting the contoured structure onto a plane. Thus, a contoured screen can be placed within space to provide a larger surface area than a non-contoured screen. Nevertheless, a planar screen can be positioned at an angle to the flow to provide sufficient surface area for a particular application. In some embodiments, the angle between the screen and a flow vector is no more than about 45 degrees and in some embodiments no more than about 30 degrees.

A screen generally can be placed within the flow of electrolyte and metal particles forming the electroactive portion of the anode of a metal-based fuel cell, such as a zinc fuel cell. The electrolyte flows through a cavity within the anode of the fuel cell adjacent a separator that separates the anode flow from the cathode, such as an air-based gas permeable cathode. Suitable cathodes and fuel cell stack structures are described further in copending U.S. patent application Ser. No. 10/288,392 to Muñoz et al., entitled "Gas Diffusion Electrodes," incorporated herein by reference. The cavity within the anode generally has a shape approximating a rectangular parallelepiped with two of the six surfaces having a much larger surface area for providing a large contact surface with the separator to produce a low impedance of ion flow between the anode and the cathode. Thus, a flow is established generally perpendicular to a normal to the large surface area surfaces of the cavity. The area of the cavity perpendicular to the flow can be referred to as the cross sectional area of the cavity for convenience. The average cross sectional area is then the average of the cross sectional area over the entire cavity. In embodiments in which the cavity has a shape that does not vary from being a rectangular parallelepiped, the cross sectional area is uniform through the cavity, and the thickness at each point is the average cross sectional area.

The surface area of the screen generally is greater than the average cross sectional area of the anode cavity. This increase in surface area can be accomplished with the screen in the cavity by placing the screen at an angle to the flow and/or by contouring the shape of the screen. Specific embodiments of screens are described further below. Generally, all or most of the flow through the anode cavity passes through the screen. The screen can be a single piece or several components that are physically attached or in contact to function as the full screen. In some embodiments, the screen surface area is at least about 20% greater than the average cross sectional area, in further embodiments, at least about 40% greater, in other embodiments at least about 60% greater, in additional embodiments, between about 80% and 300% greater than the average cross sectional area. A person of ordinary skill in the art will recognize that additional ranges of screen surface areas are contemplated and are within the present disclosure. While the screen can be placed directly within the cavity, such as at or near the exit of the flow from the cavity, the screen can alternatively be placed near but outside from the cavity, such as in a channel adjacent the cavity. In addition, a plurality of screens can be used with an approximately equivalent opening size and/or with different opening sizes. In some embodiments, a plurality of screens are placed within the flow.

The appropriate opening size within a screen generally depends on the size of the metal particles. The size of the metal particles generally decreases gradually during flow through the anode cavity. The initial metal particles introducing into the metal cavity have an average particle diameter and a distribution about the average diameter. As described herein, the diameter of a particle is the smallest distance across the particle along a principle axis since the smallest dimension is related to its ability to pass through a space or an opening. Since bridging of the particles across the small thickness of the flow channel also is effective at retaining particles within the flow channel, the openings of the screens can be roughly the size of the initial particle diameter entering the anode. The resistance in particle flow due to the screen increases the formation of particle bridges, which in turn limit the progression of the particles through the anode.

The openings in a screen can have one or more of various shapes, such as round, rectangular or hexagonal, which may or may not be the same across the screen's surface. The openings have a diameter, which can be obtained as the smallest dimension through the mathematical center of the geometrical shape of the outline of the opening. Due to the contribution of bridging to limiting the flow of particles from the system, the openings in the screen do not need to be small relative to the particle size to accomplish their intended purpose of maintaining additional control of particle flow through the anode without blocking electrolyte flow. In some embodiments, the screen openings has a diameter no more than about 400 percent of the average particle diameter, in some embodiments, no more than about 300 percent, in other embodiments, no more than about 200 percent, in further embodiments, no more than about 100 percent, in additional embodiments no more than about 90 percent and in other embodiments from about 50 percent to about 85 percent of the initial particle size. A person of ordinary skill in the art will recognize that additional ranges of screen diameters in addition to the explicit ranges above are contemplated and are within the present disclosure.

Figure 4:
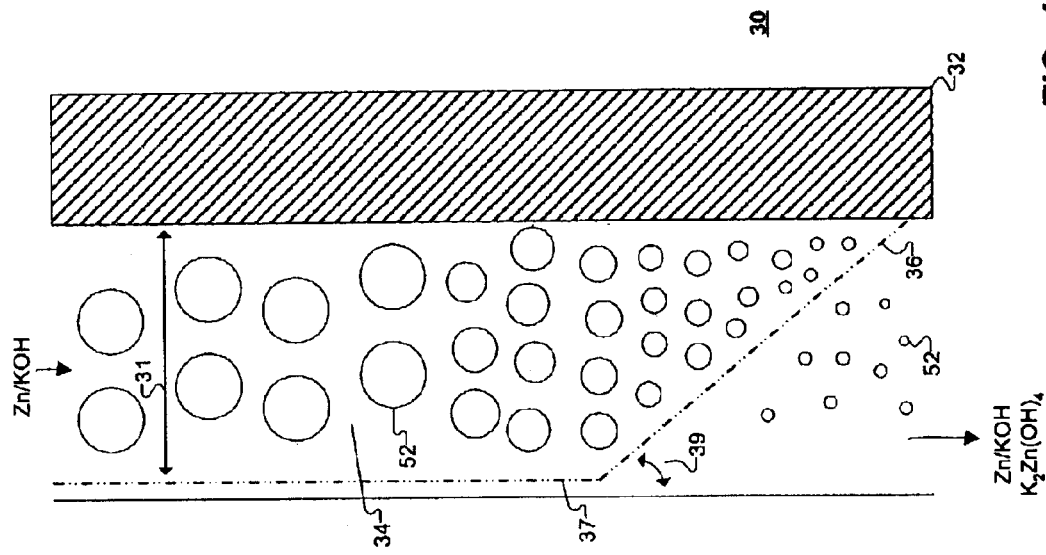
FIG. 4 is a sectional view of an exemplary fuel cell anode with a screen in the flow.

FIG. 4 is a sectional diagram of an exemplary fuel cell anode structure of the cell 30 in accordance with present invention. As Zn/KOH flows through the cell 30 (from top to bottom), Zn particles 52 are consumed (dissolve to produce electrons) to drive a load (40) and thus reduced in size as they flow in the electrolyte (KOH) to the cell bottom. Due to the anode width (31)/cross sectional area and pellet size, the pellet packing changes as the particles dissolve (are consumed). In one exemplary embodiment, the anode section width is about 2 millimeters ("mm") and the particles have a diameter of about 0.5 mm before consumption. The exemplary anode includes a screen 36 having a plurality of openings 37 and particular geometry at the anode bottom. In one exemplary embodiment the openings have a diamond shape with a width of about 0.6 mm and height of about 1.0 mm. In order to enable partial consumed particles to flow through the screen 36 (via openings 37), the surface area is ideally greater than the surface area of the anode's bottom (cross sectional area defined by the anode and cathode). The screen may an expanded metal or plastic mesh, a woven metal or plastic mesh, or a perforated metal or plastic sheet. In another embodiment the screen may includes a series of parallel ribs.

The screen at the anode's bottom in some sense acts as a filter: it retains larger particles while allowing smaller particles and electrolyte to pass through, although keeping in mind that the particles bridge across the thickness of the anode channel. The passage of smaller particles helps maintain an open porosity at the anode's bottom and thereby facilitates electrolyte flow. The screen's greater surface (depicted in FIG. 4) provides a greater flow area and further enhances the electrolyte's flow. In the exemplary screen embodiment shown in FIG. 4, the surface area is at least 40% greater than the cross-sectional area of the anode's bottom. In this embodiment, the angle 39 is acute (at most 45 degrees so the surface is at least $\sqrt{2}$ times the surface area, i.e., about 1.414 times the cross-sectional area.)

Figure 6:
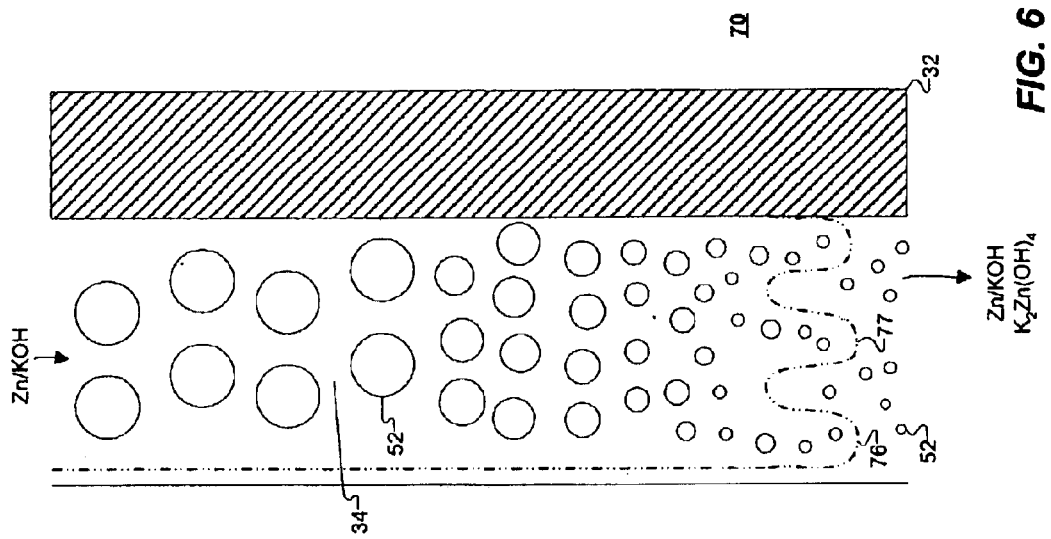
FIG. 6 is a sectional view of another alternative exemplary fuel cell anode with a screen having undulations.
Figure 5:
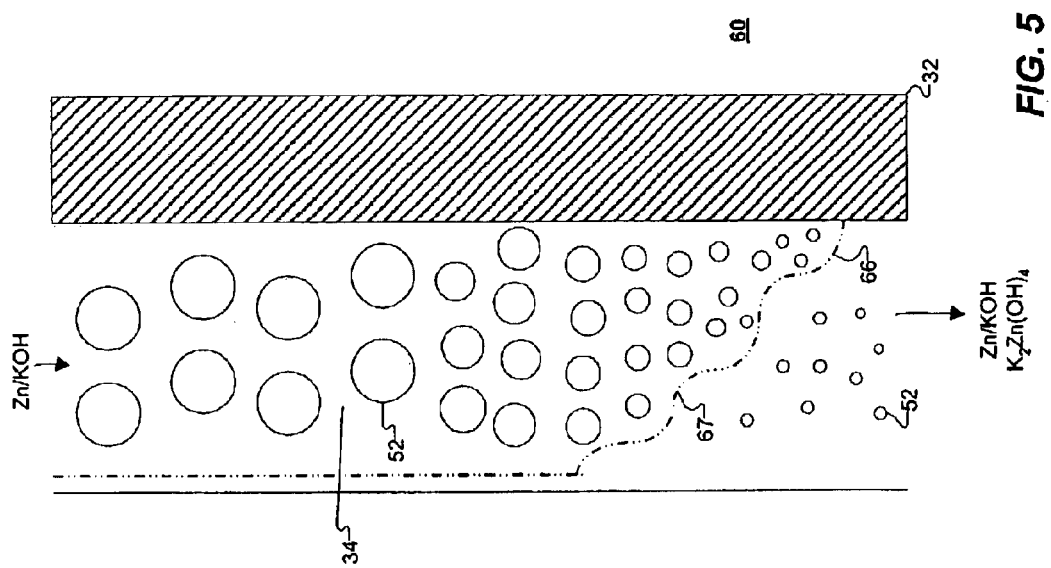
FIG. 5 is a sectional view of an alternative exemplary fuel cell anode with an undulating angled screen.
Figure 9:
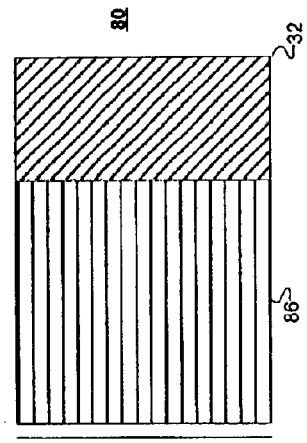
FIG. 9 is a top view of a screen having other alternative exemplary screen openings.
Figure 7:
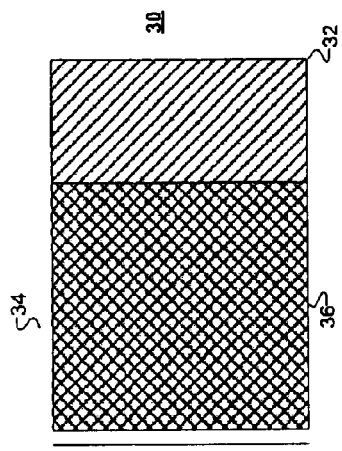
FIG. 7 is a top view of a screen having exemplary screen openings.
Figure 8:
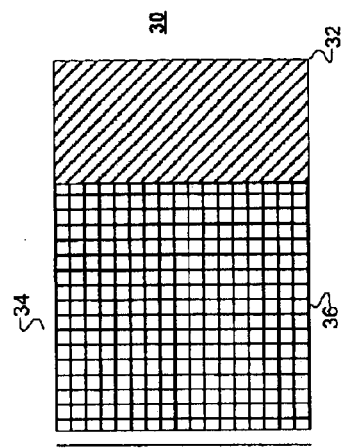
FIG. 8 is a top view of a screen having alternative exemplary screen openings.

While this invention has been described in terms of a best mode for achieving this invention's objectives, it will be appreciated by those skilled in the art that variations may be accomplished in view of these teachings without deviating from the spirit or scope of the present invention. For example, other anode screen geometries are possible within the scope of the present invention including anode screen geometry 66 shown in FIG. 5, and anode screen geometry 76 shown in FIG. 6. As shown in these figures, the anode screen geometry 66, 76 has a surface area greater than the anode's bottom cross-sectional area. FIGS. 7–9A depict top views of cell 30 with exemplary screen openings in accordance with present invention. The screen openings 36 of FIG. 7 form a diamond pattern and the screen openings 36 of FIG. 8 form a square pattern. FIG. 9 is a diagram of exemplary screen openings 86 that form a grid pattern in accordance with present invention. The screen can be supported in position, for example, with one or more triangular shaped ribs. In one embodiment, the ribs are spaced apart by about 14 mm.

The embodiments described above are intended to be illustrative and not limiting. Other embodiments are within the claims below. Although the present invention has been described with reference to preferred embodiments, workers skilled in the art will recognize that changes may be made in form and detail without departing from the spirit and scope of the invention.

What is claimed is:

1. An improved electrolyte-particulate fuel cell comprising electrolyte, a particulate fuel, an anode and a cathode, wherein the anode comprises a screen and a channel through which electrolyte flows and wherein the screen is located within the flow of electrolyte, the screen having a surface area greater than the average cross-sectional area of the channel.

2. The improved cell of claim 1 wherein the screen has a surface area at least about 40% greater than the average cross-sectional surface area of the channel.

3. The improved cell of claim 1 wherein the particulate fuel has an initial pre-consumption average particle diameter that becomes smaller as the particles migrate through the cell under electrical load, and wherein the screen has a plurality of openings, at least one of plurality of openings having an area size that enables some consumed and some partially consumed particulate fuel particles to pass.

4. The improved cell of claim 1 wherein the particulate fuel comprises zinc particles.

5. The improved cell of claim 4 wherein the pre-consumption zinc particles have an average diameter of about 0.5 mm.

6. The improved cell of claim 1 wherein the electrolyte comprises potassium hydroxide.

7. The improved cell of claim 1 wherein the channel has an average width of about 2.0 mm.

8. The improved cell of claim 1 wherein at least one of the plurality of screen openings has a diameter between about 0.6 mm and about 1.0 mm.

9. The cell of claim 1 wherein the screen has a surface area at least about 20% greater than the average cross-sectional area of the channel.

10. The cell of claim 1 wherein the screen has a surface area at least about 40% greater than the average cross-sectional area of the channel.

11. The cell of claim 1 wherein the screen has a contoured shape.

12. The improved cell of claim 1 wherein at least one of the plurality of screen openings has a diameter between about 1.4 mm and about 2.0 mm.

13. The cell of claim 11 wherein the contoured screen is mounted on an angle to the flow direction.

14. The cell of claim 11 wherein the contoured screen is mounted generally perpendicular to the flow direction.

15. The cell of claim 1 wherein the screen has a planar shape and wherein the screen is mounted at an angle to the flow.

16. The cell of claim 15 wherein the angle is no more than 45 degrees with respect to the flow direction.

17. The cell of claim 1 wherein the screen is mounted within the channel.

18. The cell of claim 1 wherein the screen is mounted adjacent the channel.

\* \* \* \* \*